(12) United States Patent
Brendle, Jr. et al.

(10) Patent No.: US 6,292,506 B1
(45) Date of Patent: Sep. 18, 2001

(54) LENGTH SELECTABLE, HARDWARE EFFICIENT PSEUDORANDOM CODE GENERATOR

(75) Inventors: John F. Brendle, Jr., Bristow, VA (US); James P. Stephens, Sr., Bellbrook, OH (US); Michael A. Temple, Huber Heights, OH (US); Robert S. Parks, Fairborn, OH (US)

(73) Assignee: The United States of America as represented by the Secretary of the Air Force, Washington, DC (US)

( * ) Notice: Subject to any disclaimer, the term of this patent is extended or adjusted under 35 U.S.C. 154(b) by 0 days.

(21) Appl. No.: 09/205,313

(22) Filed: Dec. 4, 1998

(51) Int. Cl.$^7$ .................................................. H04L 15/28
(52) U.S. Cl. ........................................... 375/130; 375/246
(58) Field of Search ................................. 375/130, 140, 375/265, 246; 364/717; 380/46

(56) References Cited

U.S. PATENT DOCUMENTS

| | | | |
|---|---|---|---|
| 4,550,431 | 10/1985 | Werth et al. | 382/1 |
| 5,046,036 | 9/1991 | Tezuka | 364/717 |
| 5,566,099 | 10/1996 | Shimada | 364/717 |
| 5,606,322 | 2/1997 | Allen et al. | 341/173 |
| 5,675,645 | 10/1997 | Schwartz et al. | 380/4 |
| 5,774,493 | 6/1998 | Ross | 375/206 |

*Primary Examiner*—Chi Pham
*Assistant Examiner*—Dung X. Nguyen
(74) *Attorney, Agent, or Firm*—Gina S. Tollefson; Gerald B. Hollins; Thomas L. Kundert

(57) ABSTRACT

A method and device for generating a pseudorandom electrical signal for enabling spread spectrum communication scrambling by directing data entry into pseudorandom number generator integrated circuit chip controlling registers using a length selectable feedback logic data sequence and either computer programmable selector means or manual selector means to communicate the logic data sequence characters to buffers. The logic data sequence characters are clocked to a pseudorandom number generating register of an integrated circuit chip and the pseudorandom electrical signal is generated by selectively tapping a signal code therefrom. The method and device features a pseudorandom electrical signal length varying capability and is portable to various laboratory applications without a change in hardware configuration.

10 Claims, 9 Drawing Sheets

LENGTH SELECTABLE, HARDWARE EFFICIENT PSEUDORANDOM CODE GENERATOR

RIGHTS OF THE GOVERNMENT

The invention described herein may be manufactured and used by or for the Government of the United States for all governmental purposes without the payment of any royalty.

BACKGROUND OF THE INVENTION

The field of the invention is pseudorandom code generators for laboratory use in testing and evaluation of communication systems and more specifically manual entry, programmable, pseudorandom code generators.

Spread spectrum (SS) communications grew out of research efforts during World War II to provide secure means of communications in hostile environments. Spread spectrum communications are described in *Digital Communication Fundamentals and Applications* by Bernard Sklar, Prentice Hall, 1988. During the early years of spread spectrum investigation, one technique considered for operating a transmitter and receiver synchronously with a truly random spreading signal was the Transmitted Reference system. In a Transmitted Reference system, the transmitter sends two versions of an unpredictable wideband carrier, one modulated by data and the other unmodulated, which are transmitted on separate channels. At the receiver, the unmodulated carrier is used as a reference signal for despreading the data-modulated carrier. The principal advantage of a Transmitted Reference system is there are no significant synchronization problems at the receiver, since the spread data-modulated signal and the despreading waveform are transmitted simultaneously. The principle disadvantage of Transmitted Reference system is the spreading code is sent in the clear and thus is available to any listener. As such, the system is easily spoofed by a jammer capable of sending a pair of waveforms acceptable to the receiver. Other disadvantages include performance degradation at low signal levels due to noise being present on both transmitted signals and twice the bandwidth and transmitted power are required because of the need to transmit the reference.

Modern spread spectrum systems use a technique called Stored Reference wherein the spreading and despreading waveforms are independently generated at the transmitter and receiver, respectively. The main advantage of a Stored Reference system is that a well-designed code signal cannot be predicted by an unintended receiver monitoring the transmission. The noise-like code signals used in Stored Reference systems cannot be "truly random" as in the case of a Transmitted Reference system. Rather, signals which possess noise-like properties called pseudonoise or pseudorandom signals, are employed as the spreading waveforms.

A linear feedback shift register is often used to generate the pseudorandom spreading code. The shift register operation is controlled by a sequence of clock pulses. At each clock pulse, the contents of each stage in the register are shifted one stage to the right and fed back through a series of interconnected taps. The shift register sequence is usually defined as the output of the last stage. The shift register sequence is dependent on the number of stages, the feedback tap connections and the initial conditions (starting phase). The output sequence is classified as either maximal length or non-maximal length. A maximal length sequence has the property that for an n-stage linear feedback shift register, the sequence repetition period (in clock pulses p) is $p=2^n-1$. If the sequence length is less than $(2^n-1)$, the sequence is classified as a non-maximal length sequence.

In the Transmitted Reference system, a truly random code can be utilized for spreading and despreading since the code signal and data-modulated code signal are simultaneously transmitted over different regions of the spectrum. The Stored Reference approach cannot use a truly random code signal because a copy of the code needs to be stored or generated at the receiver. For a Stored Reference system, a pseudonoise or pseudorandom code is typically used. A truly random signal is unpredictable and future variations can only be described in a statistical sense. However, a pseudorandom signal is not really random—it is a deterministic periodic signal that is known to both the transmitter and receiver. Even though the signal is deterministic, it possesses statistical properties consistent with sampled white noise and appears to be truly random to an unauthorized listener. There are three basic properties that can be found in any periodic binary sequence as a test for the appearance of randomness. These properties are called balance, run and correlation. If all three property requirements are satisfied, the sequence is classified as a pseudorandom sequence.

The generation of pseudorandom digital codes for spread spectrum analysis and research in the laboratory is of great interest. Currently in the art, the generation of a pseudorandom code for laboratory use in spread spectrum analysis and other research is accomplished by using software, but is limited in speed due to the speed of the executing computer system. Also, software generation of pseudorandom number codes requires the full use of a computer and expensive interface hardware if the codes are to be used with instrumentation. Hardware code generators are also used to generate pseudorandom codes and are often designed for a specific application and do not have the flexibility and programmability desirable in laboratory testing. There is a need in the art for a pseudorandom code generator that is convenient and flexible and capable of serving a multitude of laboratory purposes. The present invention fills that need by providing a manual entry, programmable pseudorandom code generator that requires minimal external equipment to implement.

SUMMARY OF THE INVENTION

A method and device for generating a length selectable pseudorandom electrical signal for enabling spread spectrum communication scrambling by directing data entry into pseudorandom code generator integrated circuit chip controlling registers using a length selectable feedback logic data sequence and either computer programmable selector means or manual selector means to communicate the logic data sequence characters to buffers. The logic data sequence characters are clocked to integrated circuit chip registers to enable a pseudorandom number generating register, a pseudorandom electrical signal being generated by selectively tapping a signal code therefrom. The method and device features a pseudorandom electrical signal length varying capability and is portable to various laboratory applications, both features operable without a change in hardware configuration.

It is therefore an object of the invention to provide a pseudorandom electrical signal length varying capability with a static hardware configuration in the exercise of a pseudorandom code generating integrated circuit chip.

It is another object of the invention to provide a manual entry pseudorandom electrical signal length varying capability with a static hardware configuration in the exercise of a pseudorandom code generating integrated circuit chip.

It is another object of the invention to provide a computer programmable pseudorandom electrical signal length varying capability with a static hardware configuration in the exercise of a pseudorandom code generating integrated circuit chip.

It is another object of the invention to provide a pseudorandom electrical signal length varying capability with a static hardware configuration in the exercise of a pseudorandom code generating integrated circuit chip useable with a multitude of spread spectrum communication laboratory applications.

It is another object of the invention to provide a pseudorandom electrical signal length varying capability with a static hardware configuration in the exercise of pseudorandom code generating integrated circuit chip employing minimal dedicated hardware.

These and other objects of the invention are described in the description, claims and accompanying drawings and are achieved by a length selectable method of generating a spread spectrum communication scrambling pseudorandom electrical signal by directing data entry into pseudorandom code generator integrated circuit chip controlling registers comprising the steps of:

identifying a pseudorandom electrical signal length-determining feedback logic data sequence;

communicating said feedback logic data sequence characters from said identifying step to digital logic converting buffers by manually controllable selector means;

clocking data characters from said communicating step to integrated circuit chip controlling registers; and generating a spread spectrum communication scrambling pseudorandom electrical signal in a pseudorandom code generating register of said integrated circuit chip by clock dependent tapping of data from said pseudorandom code generating register.

DETAILED DESCRIPTION

The method and device that is the invention provides the capability for an operator to generate pseudorandom code signals of a selected length and for a selected application by exercising a pseudorandom code generating integrated circuit chip without modifying the integrated circuit chip data entry hardware configuration. Conventional laboratory operation in spread spectrum communication research generally requires a computer and specific software dedicated to a single spread spectrum communication application. Further, a desired change in pseudorandom code signal length requires a modification to the data entry hardware and/or software, both being time consuming and possibly labor intensive. The method and device of the invention fills a need in the art for a convenient method of generating pseudorandom code signals of varying lengths without dedicating the pseudorandorm code generating and data entry system to a single application and without changing the hardware configuration thereof for each selected length of pseudorandom code signal, resulting in time and hardware savings for a spread spectrum communication researcher. The invention is hereafter described using a STEL-1032 pseudorandom code generator integrated circuit chip Standford Telecom. Although the STEL-1032 is used in describing the invention, any pin compatible pseudorandom number coder can be used.

Generally, the STEL-1032 chip is a 5 volt DC TTL CMOS bipolar integrated circuit which operates by programming data in registers including a pseudorandom number generating register to generate output signals which can be described as pseudorandom electrical signal pulses. The pseudorandom number generating register generates codes with programmable lengths and polynomials. Feedback logic polynomials also known as generating polynomials of Galois field arithmetic known in the art are used to program pseudorandom code generating integrated circuit chips such as the STEL-1032 with the polynomial parameter being length. Most text books or reference books in the field of spread spectrum communications contain Galois field polynomial tables.

Figure 1:
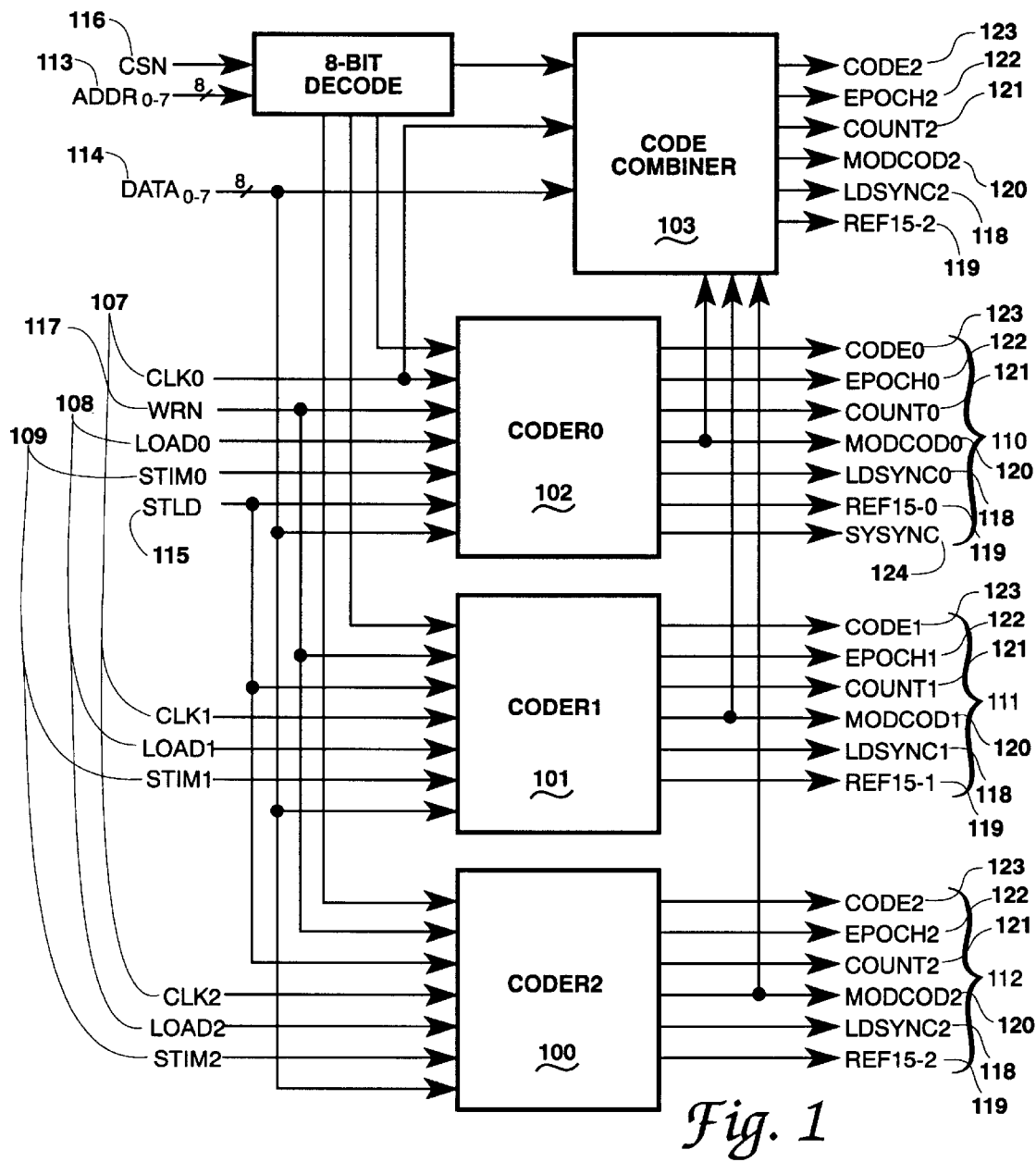
FIG. 1 shows a block diagram of a STEL-1032 pseudorandom code generator.

A technical description of the STEL-1032 may be found in *The Spread Spectrum Handbook*, by Robert J. Zavrel, Santa Clara Calif., Standford Telecommunications, Inc. 1990. The STEL-1032 PRN coder chip is composed of four major components, three independent 32-bit register code generators and a code combiner. Each of the three 32-bit code generators contain a number of functional blocks including several registers and a pseudorandom number generator. Each of the three code generators are capable of independently generating all possible codes with lengths up to $2^{32}-1$ (4,294,967,295) bits. A block diagram for the STEL-1032 chip is shown in FIG. 1. In FIG. 1, the three independent 32-bit code generators Coder0, Coder1 and Coder2 are shown at 102, 101 and 100, respectively. The STEL-1032 chip has the following inputs: an 8-bit address bus (ADDR) 113, an 8-bit data bus (DATA) 114, three coder clocks (CLK0, CLK1, CLK2) shown collectively at 107, three load pulses (LOAD0, LOAD1, LOAD2), shown collectively at 108, three data lines and a modulation clock (STIM0, STIM1, STIM2, and STLD), shown collectively at 109 and at 115, a chip selection (CSN) shown at 116, and a register write control (WRN) shown at 117. The 8-bit data bus shown at 114 is mapped into the 32-bit registers by means of address inputs $ADDR_0$ through $ADDR_7$ shown at 113. The output of Coder0 is shown at 110, the output of Coder1 is shown at 111 and the output of Coder2 is shown at 112.

In addition to the three independent random number output codes that can be generated by Coder0, Coder1 and Coder2, the outputs of the code generators can be EXORed together by code combiner 103 in FIG. 1. The outputs of Coder0 and Coder1 at 102 and 101, respectively, can be EXORed together by code combiner 103 or all three code generator outputs can be EXORed together by code combiner 103. The output of the code combiner 103 is also available both late and early by one-half of a clock cycle relative to the punctual code (on time). Non-linear codes are generated by means of an internally programmable look-up table. The three coders 101, 102 and 103 are completely independent, except for the COUNT and EPOCH output registers which are interconnected through the coders' control logic. This allows each coder to be controlled by either of the two other coders. The use of nonlinear sequences in spread spectrum communications is one way to increase security in applications where security is important, that is when it is necessary that the unintended listener not be able to obtain complete knowledge of the spreading code or encryption stream being employed.

Figure 2:
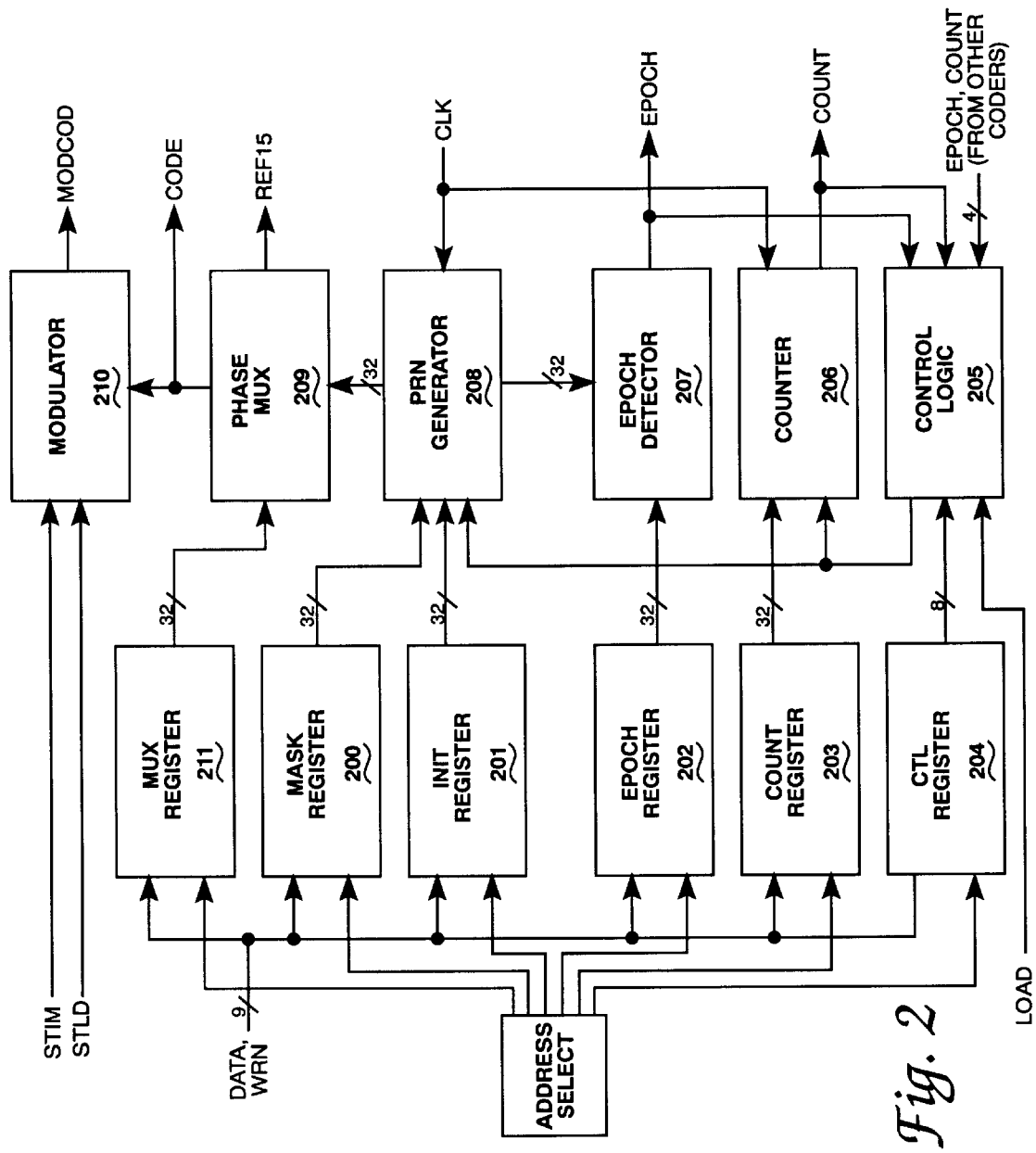
FIG. 2 shows a block diagram of an individual coder in the FIG. 1 generator.
Figure 3:
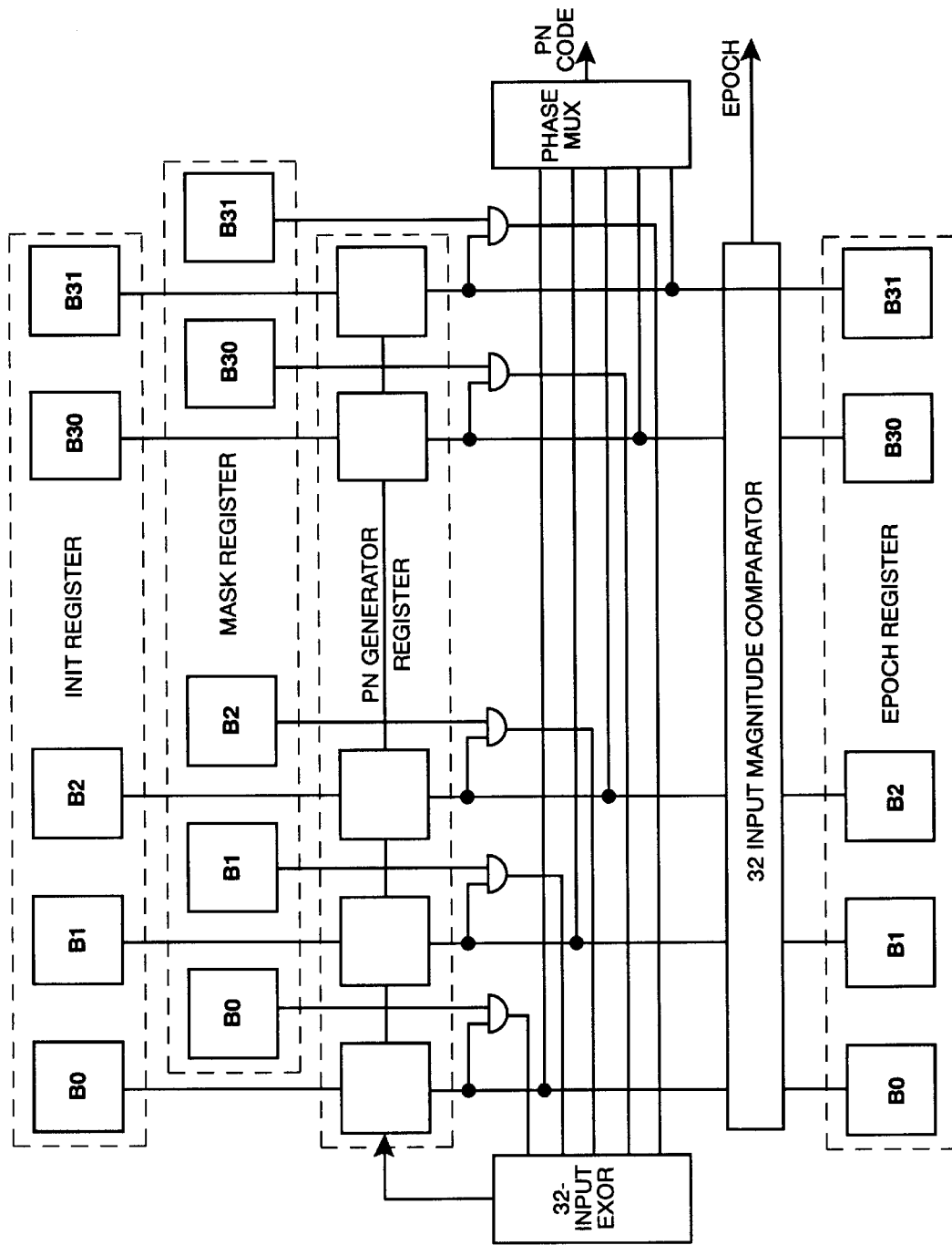
FIG. 3 shows a block diagram of register connections of an individual FIG. 2 coder.

The functional blocks within each of the three FIG. 1 independent coders are shown in FIG. 2. Each of the three coders contain the six registers listed in Table 2 and shown in FIG. 2 including a MUX register at 211, a MASK register at 200, an INIT register at 201, an EPOCH register at 202, a COUNT register at 203 and a CTL register at 204. Each coder also contains a modulator shown at 210, a phase mux at 209, a PRN generator shown at 208, an EPOCH detector at 207, a counter at 206 and a control logic at 205. The register connections for an individual coder are shown in FIG. 3. The STEL-1032 chip is programmed by means of the data stored in the six registers. The pseudorandom codes can be started with an arbitrary phase by loading the starting phase code into the INIT register 201 in FIG. 2. Feedback tap connections for each code generator are controlled by contents of the MASK register 200. A specific sequence in the code generator registers can be detected and a pulse generated via a 32-bit magnitude comparator and the values stored in the EPOCH register 202. The 32-bit COUNT register at 203 is used to set the counter stop point and once triggered, the counter will run for a number of clock cycles equal to the number stored in the COUNT register 203 and then generate a COUNT pulse. The code generators and counters can be reset on the EPOCH or COUNT pulse. The codes can be made to restart at this point if desired.

The PRN coder, shown at 208 in FIG. 2, has an 8-bit address bus. The addressing scheme is shown in Table 3 where A7 represents the Most Significant Bit (MSB) and A0 represents the Least Significant Bit (LSB)):

TABLE 1

Address bits ADDR$_7$–ADDR$_5$.

| Coder Selected | A7 | A6 | A5 |
|---|---|---|---|
| Coder0 | 0 | 0 | 0 |
| Coder1 | 0 | 0 | 1 |
| Coder2 | 0 | 1 | 0 |
| All Coders | 0 | 1 | 1 |
| Code Combiner | 1 | 0 | 0 |

Each independent code generator has the internally programmable registers described in Table 2.

TABLE 2

Address bits ADDR$_4$–ADDR$_0$.

| Register Selected | A4 | A3 | A2 | A1 | A0 |
|---|---|---|---|---|---|
| MASK | 0 | 0 | 0 | $x_1$ | $x_0$ |
| INIT | 0 | 0 | 1 | $x_1$ | $x_0$ |
| EPOCH | 0 | 1 | 0 | $x_1$ | $x_0$ |
| COUNT | 0 | 1 | 1 | $x_1$ | $x_0$ |
| MUX | 1 | 0 | 0 | 0 | 0 |
| CTL | 1 | 0 | 0 | 0 | 1 |

Variables $x_1$ and $x_0$ are determined according to Table 3 below such that the selected 32-bit register is sequentially loaded 8 bits at a time.

TABLE 3

Address bit ADDR$_1$–ADDR$_0$ for 32 bit DATA.

| Register bits loaded | $x_1$ | $x_0$ |
|---|---|---|
| bits 0–7 | 0 | 0 |
| bits 8–15 | 0 | 1 |
| bits 16–23 | 1 | 0 |
| bits 24–31 | 1 | 1 |

The 32-bit PRN code generator 208 generates codes with programmable lengths and polynomials based on Galois field Arithmetic and feedback logic polynomials. The polynomials are set by programming the desired taps in the MASK register 200. Each bit in the MASK register 200 which is set to a logic "1" enables the corresponding tap in the PRN generator polynomial and a logic "0" disables the tap. "G" is the preselected polynomial and the "D" variables are the coefficients.

$$G=1+D_1(x)+D_2(x^2)+D_3(x^3) \ldots +D_{31}(x^{31})+D_{32}(x^{32})$$

Where $$D_1=\text{bit } 0, D_2=\text{bit } 1, D_3=\text{bit } 2, \text{etc.}$$

The last tap set determines the maximum length of the PRN generator register.

The 32-bit INIT register 201 is used to define the start value of the code generated in the PRN generator 208. The contents of the INIT register 201 are loaded into the PRN generator 208 when a load command is issued or a control pulse occurs. A control pulse occurs when the function is enabled and a COUNT or EPOCH pulse occurs.

During every clock cycle, active bits of the PRN generator 208 output are compared with the value stored in the EPOCH register 202. The contents of the 32-bit EPOCH register 202 define the distinct code value to be detected. All bits in the EPOCH register 202 beyond the most significant feedback tap in the PRN generator 208 must always be set to "0", otherwise a match will never be detected.

The 32-bit COUNT register 203 in FIG. 2 sets the counter stop point. Once the PRN generator 208 starts, the counter runs for a number of clock pulses equal to the number stored in the COUNT register 203 and then generates a COUNT pulse. Contents of the COUNT register 203 are loaded into the PRN generator 208 when a load command is issued or a control pulse occurs. A control pulse occurs when the control (CTL) function is enabled and a COUNT or EPOCH pulse occurs.

The 5-bit Phase MUX register 211 selects the PRN generator register 208 output bits used for the code output. The value stored in the MUX register 211 is decoded and determines the tap number used. If the MUX register value is 00101, the code output will come from the $6^{th}$ PRN generator register. For MUX register value 00000, the $1^{st}$ is used and a MUX register value of 11111 corresponds to the $32^{nd}$ tap being used.

The 8-bit CTL register 204 in FIG. 2 determines the reloading of the coder and counter. The functions performed by the bits in the CTL register 204 are shown in Table 4(a)–4(b).

TABLE 4

Control (CTL) Register Bit Functions: (a) $B_7$–$B_6$, (b) $B_5$–$B_4$, (c) $B_3$–$B_2$, (d) $B_1$–$B_0$.

| $B_7$ | $B_6$ | Function |
|---|---|---|
| 0 | 0 | Counter is not reloaded on any EPOCH pulse |
| 0 | 1 | Counter is reloaded on EPOCH0 pulse |
| 1 | 0 | Counter is reloaded on EPOCH1 pulse |
| 1 | 1 | Counter is reloaded on EPOCH2 pulse |
| | | (a) |

| $B_5$ | $B_4$ | |
|---|---|---|
| 0 | 0 | Counter is not reloaded on any COUNT pulse |
| 0 | 1 | Counter is reloaded on COUNT0 pulse |
| 1 | 0 | Counter is reloaded on COUNT1 pulse |
| 1 | 1 | Counter is reloaded on COUNT2 pulse |
| | | (b) |

| $B_3$ | $B_2$ | |
|---|---|---|
| 0 | 0 | PRN generator is not reloaded on any EPOCH pulse |
| 0 | 1 | PRN generator is reloaded on EPOCH0 pulse |
| 1 | 0 | PRN generator is reloaded on EPOCH1 pulse |
| 1 | 1 | PRN generator is reloaded on EPOCH2 pulse |
| | | (c) |

| $B_1$ | $B_0$ | |
|---|---|---|
| 0 | 0 | PRN generator is not reloaded on any COUNT pulse |
| 0 | 1 | PRN generator is reloaded on COUNT0 pulse |
| 1 | 0 | PRN generator is reloaded on COUNT1 pulse |
| 1 | 1 | PRN generator is reloaded on COUNT2 pulse |
| | | (d) |

The code combiner block shown at 103 in FIG. 1 uses the MODCOD outputs of the three coders to address a lookup table, shown as Table 5, to produce the MIXCOD output. This allows the production of non-linear codes.

TABLE 5

Code Combiner Lookup Register Table.

| MODCOD2 | MODCOD1 | MODCOD0 | MIXCOD |
|---|---|---|---|
| 0 | 0 | 0 | Look-up Reg. Bit 0 |
| 0 | 0 | 1 | Look-up Reg. Bit 1 |
| 0 | 1 | 0 | Look-up Reg. Bit 2 |
| 0 | 1 | 1 | Look-up Reg. Bit 3 |
| 1 | 0 | 0 | Look-up Reg. Bit 4 |
| 1 | 0 | 1 | Look-up Reg. Bit 5 |
| 1 | 1 | 0 | Look-up Reg. Bit 6 |
| 1 | 1 | 1 | Look-up Reg. Bit 7 |

The 8-bit DATA bus shown at 114 in FIG. 1 writes data into the registers. $DATA_7$ is the most significant bit (MSB) and $DATA_0$ is the least significant bit (LSB). The 8-bit address directs the data to the proper register.

When the reset input is set low, all of the registers inside the PRN generator, shown at 208 in FIG. 2, are set to zero. Normal operation will not commence until an initialization value has been loaded into the coders from their corresponding INIT registers.

CLK0 through CLK2 shown at 107 in FIG. 1 are the clocks for Coder0 through Coder2 respectively. All operations occur on the rising edges of the clocks, with the exception of the early and late outputs, which change on the falling edges of CLK0. The clocks should nominally be square waves, with a maximum frequency of 30 MHz.

The register write control (WRN) shown at 117 in FIG. 1 is normally high. When this line goes low, data is written into the register(s) selected by the address lines and latched on the rising edge of WRN at 117. The Chip Select (CSN) must also be low to enable the data loading.

On the rising edge of the clock following the falling edge of a LOAD input, a load command is issued. This will cause the corresponding coder register and counter to be loaded with the contents of the corresponding INIT and COUNT Register, respectively.

Data applied to the STIM0–STIM2, shown at 109 in FIG. 1, inputs is modulo-2 added with the outputs of the corresponding coder (Coder0–Coder2). The data is latched in on the falling edge of the STLD input, shown at 115 in FIG. 1.

As shown in FIG. 1, the STEL-1032 chip has a total of 25 outputs. The code combiner outputs XOR01, XOR012, MIXCOD, EARLY, LATE, and PUNCT. Each coder outputs a CODE, EPOCH, COUNT, MODCOD, LDSYNC, and REF15. An STSYNC signal comes from Coder0.

The CODE0–CODE2 outputs, shown at 123 in FIG. 1, are the outputs of the Coder0–Coder2. The register bit in the coder from which the output is derived is set by the Phase MUX.

The MODCOD0–MODCOD2 outputs, shown at 120 in FIG. 1, are the CODE0–CODE2 signals after modulation by the STIM0–STIM2 inputs, shown at 109 in FIG. 1. The register bit in the coder from which the output is derived is set by the Phase MUX.

The LoaDSNYC, shown at 118 in FIG. 1, output goes low for one clock cycle after the contents of the corresponding INIT register, shown at 201 in FIG. 2 been loaded into the corresponding coder. This pulse indicates the clock cycle in which the coder value is identical to that of the INIT register 201 in FIG. 2.

The REF15-0–REF15-2 outputs, shown at 119 in FIG. 1, are the reference codes derived from the taps number 15 of the corresponding coder. These outputs will be identical to the corresponding CODE0–CODE2 outputs, shown at 123 in FIG. 1, when the data stored in the corresponding Phase MUX, shown at 209 in FIG. 2 is 01111.

The EPOCH0–EPOCH2 outputs, shown at 122 in FIG. 1, are normally high and go low whenever the corresponding coder code is equal to the code stored in the EPOCH register, shown at 202 in FIG. 2, for that coder. This condition will not be detected and the EPOCH output will not go low if this condition occurs within 2 clock cycles of the rising edge on the corresponding EPOCH input.

The COUNT0–COUNT2 outputs, shown at 121 in FIG. 1 are delayed replicas of the LDSYNC0–LDSYCN2 outputs, shown at 118 in FIG. 1. The length of the delay is equal (in clock cycles) to the value stored in the corresponding COUNT Register shown at 203 in FIG. 2.

The MODCOD0–MODCOD2 signals, shown at 120 in FIG. 1, are used to address the Code Combiner Lookup Register, shown above in Table 5. The data bit stored in the location addressed by the three bits of the MODCOD0–MODCOD2 is the MIXCOD output.

The XOR01 output is the result of the modulo-2 addition (XOR) of CODE0 and CODE 1 signals. The XOR012 output is the result of modulo-2 addition of the CODE0, CODE1, and CODE2 signals. The results are delayed by one clock cycle before appearing on the XOR01 and XOR012 outputs.

The PUNCT output is an exact replica of the MIXCOD output delayed by one clock cycle. The EARLY output is an exact replica of the PUNCT output advanced by a half clock cycle. The LATE output is an exact replica of the PUNCT output delayed by half a clock cycle. This is achieved by clocking the signals into the output register on the falling edges of CLK0. In order to make the advance and delay exactly half a clock cycle, the duty cycle of CLK0 must be exactly 50%.

The STSYNC output, shown at 124 in FIG. 1, is normally high and goes low for one clock cycle following a falling edge on the STLD input signal. The result of the new modulation bits will appear on the output codes MODCOD0–MODCOD2 during this clock cycle.

An 8-bit address is utilized by the STEL-1032 chip to ensure that data is directed into the proper register. The addressing scheme is shown in Tables 1 through 3. By examining the addressing tables, it can be seen that the address can be broken into three separate blocks, coder selection, register selection and 32/8-bit data selection. The 32-bit registers are loaded in 8-bit groupings with the two least significant bits of the address ($ADDR_0$ and $ADDR_1$) designating which 8-bit group is being loaded. When 32-bit data is being loaded, a 2-bit binary counter is employed to toggle through the $ADDR_0$ and $ADDR_1$ combinations. When 8-bit data is being loaded, $ADDR_0$ and $ADDR_1$ are fixed.

Figure 4:
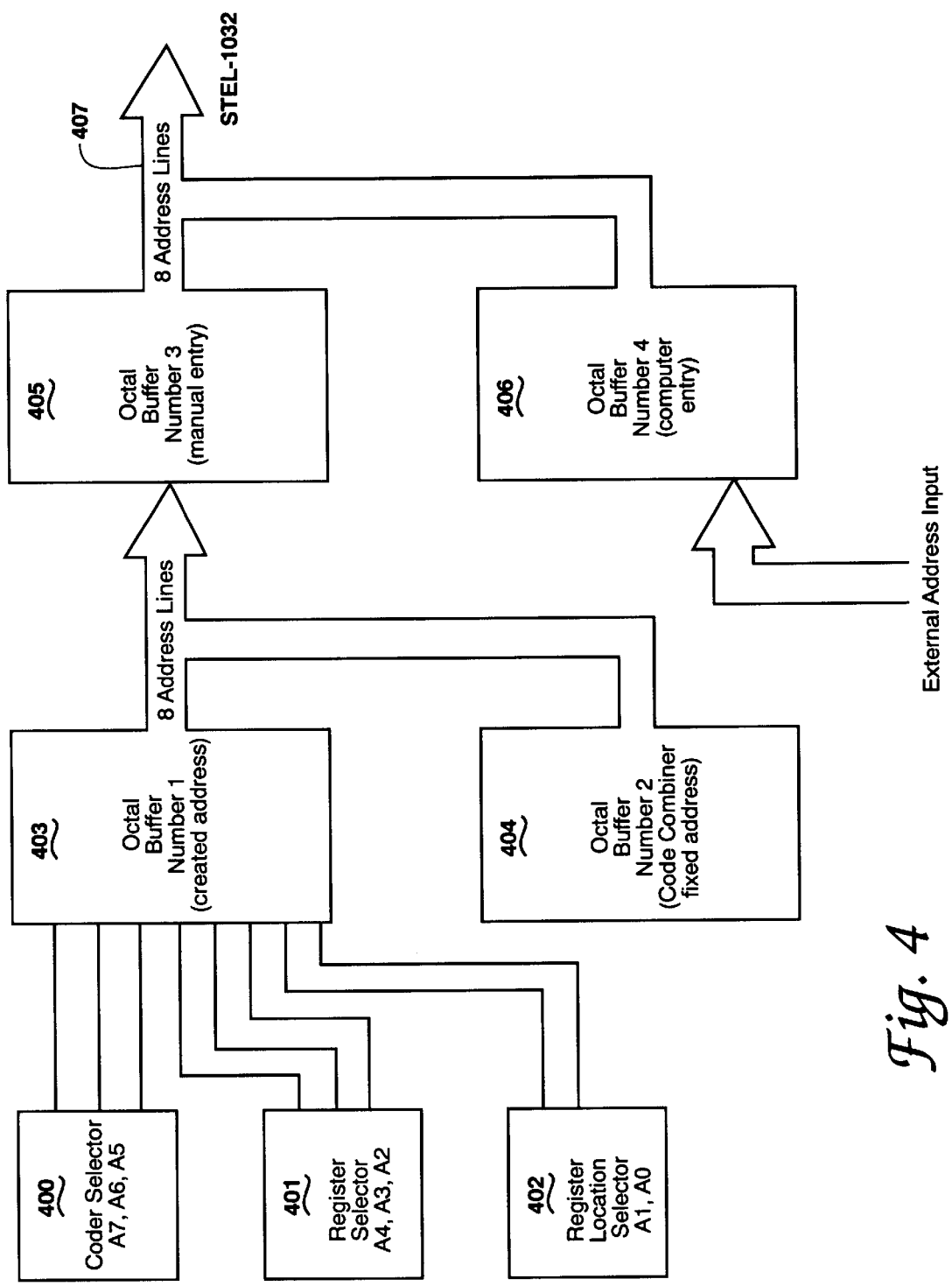
FIG. 4 shows an address block diagram.

FIGS. 1–3 provide detail and explanation for operation of the pseudorandom number generating integrated circuit, the STEL-1032, exercised by the method and device of the invention. FIG. 4 is a block diagram generally showing the data entry pathways of the invention for exercising the STEL-1032. The data entry pathways include coder selector capability, register selector capability and register location selector capability. After the 8-bit address utilized by the STEL-1032 chip to ensure that data is directed into the proper register is formed, it is sent to two sets of octal buffers shown at 403 and 404 in FIG. 4, where in each set only one buffer is enabled at a time. If the code combiner lookup table is selected, octal buffer number 2 at 404 is enabled and its 8-bit address is passed on; otherwise octal buffer number 1 at 403 is enabled and the formed address is passed on to octal buffer number 3 at 405. When the code generator is operating in manual entry mode the address is passed on, as shown at 407, to the STEL-1032 via octal buffer number 3 at 405. If external programming is being performed, octal buffer number 4 at 406 passes the address. The arrangement of the coder selector 400, register selector 401 and 32/8 bit data selection is described below.

Figure 5:
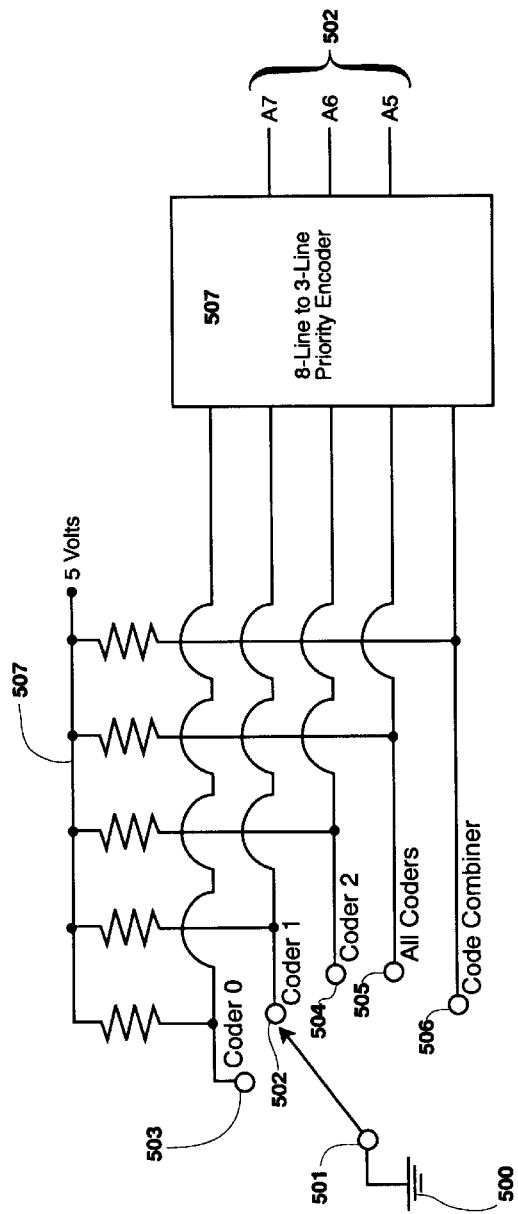
FIG. 5 shows a coder selector wiring diagram.

The coder selector shown at 400 in FIG. 4 has five options and occupies the three most significant bits of the address ($ADDR_7$–$ADDR_5$). The coder selector takes one of five choices and outputs the three bits corresponding to the address of the coder selected. As shown in Table 6, an 8-line to 3-line priority encoder produces a 3-bit output based on the location of the first low level logic encounter. FIG. 5 is a coder selector wiring diagram and shows how this TTL device is used in the coder selector arrangement. Using a 2.2 KΩ resistor from bus 507 as a pull-up resistor, the input lines 502 through 506 remain a logic high until selected. The grounded coder selector switch 501 may be a push button switch which allows one selection at a time, Coder1 is shown selected in the arrangement of FIG. 5. By selecting a coder, the corresponding line is grounded and a logic low appears on the input line and $ADDR_7$–$ADDR_5$ shown at 113 in FIG. 1. At 502 in FIG. 5 are outputs from the encoder 507 in accordance with Table 6.

TABLE 6

8-Line to 3-Line Priority Encoder Function Table.

| INPUTS | | | | | | | | OUTPUTS | | |
|---|---|---|---|---|---|---|---|---|---|---|
| 0 | 1 | 2 | 3 | 4 | 5 | 6 | 7 | A2 | A1 | A0 |
| H | H | H | H | H | H | H | H | H | H | H |
| x | x | x | x | x | x | x | L | L | L | L |
| x | x | x | x | x | x | L | H | L | L | H |
| x | x | x | x | x | L | H | H | L | H | L |
| x | x | x | x | L | H | H | H | L | H | H |
| x | x | x | L | H | H | H | H | H | L | L |
| x | x | L | H | H | H | H | H | H | L | H |
| x | L | H | H | H | H | H | H | H | H | L |
| L | H | H | H | H | H | H | H | H | H | H |

Figure 6:
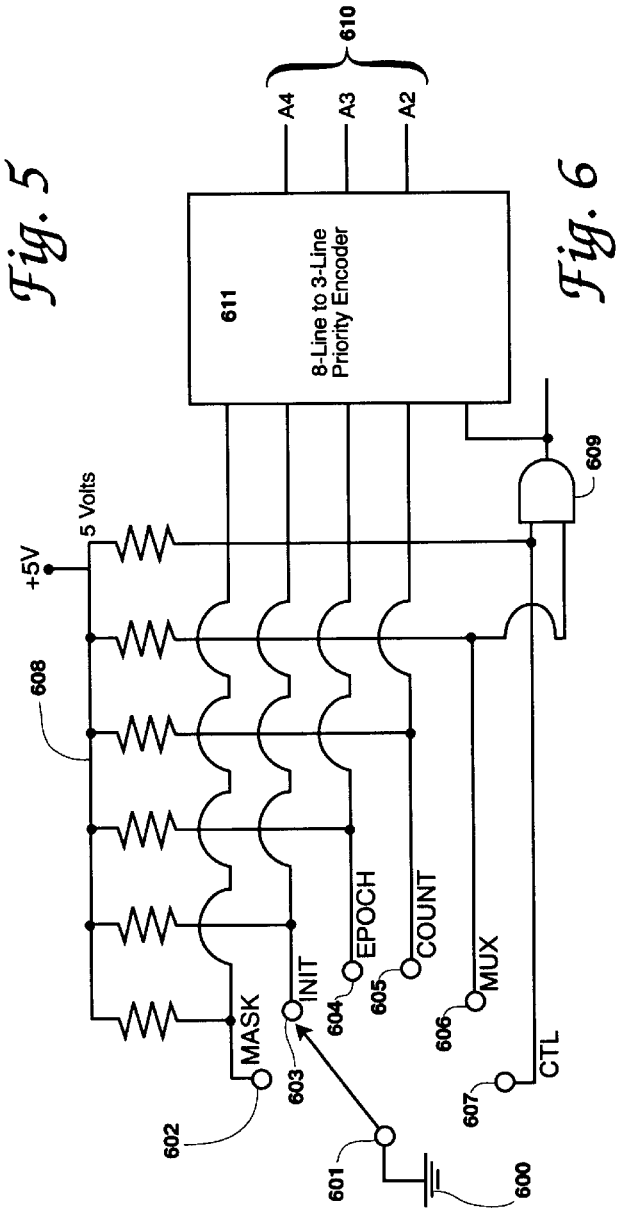
FIG. 6 shows a register selector wiring diagram.

FIG. 6 shows a register selector wiring diagram. The register selector wiring diagram of FIG. 6 is similar to the coder selector wiring diagram of FIG. 5. A pull-up resistor from bus 608 maintains the input lines 602–607 at a logic high until selected by the register selector switch 601 shown tied to ground 600. The difference is there are six registers, 602 through 607, to select and only five combinations of $ADDR_4$–$ADDR_2$ are output. The MUX register selection 606 and CTL register selection 607, both 8-bit data registers, share $ADDR_4$–$ADDR_2$ but have different $ADDR_1$ and $ADDR_0$ bits. The MUX register 606 and CTL register 607 control lines are coupled through an AND gate 609; if either register 606 or 607 selection is selected the output of the AND gate 609 is low and is coupled as input to the encoder 611, otherwise the line is high.

Figure 7:
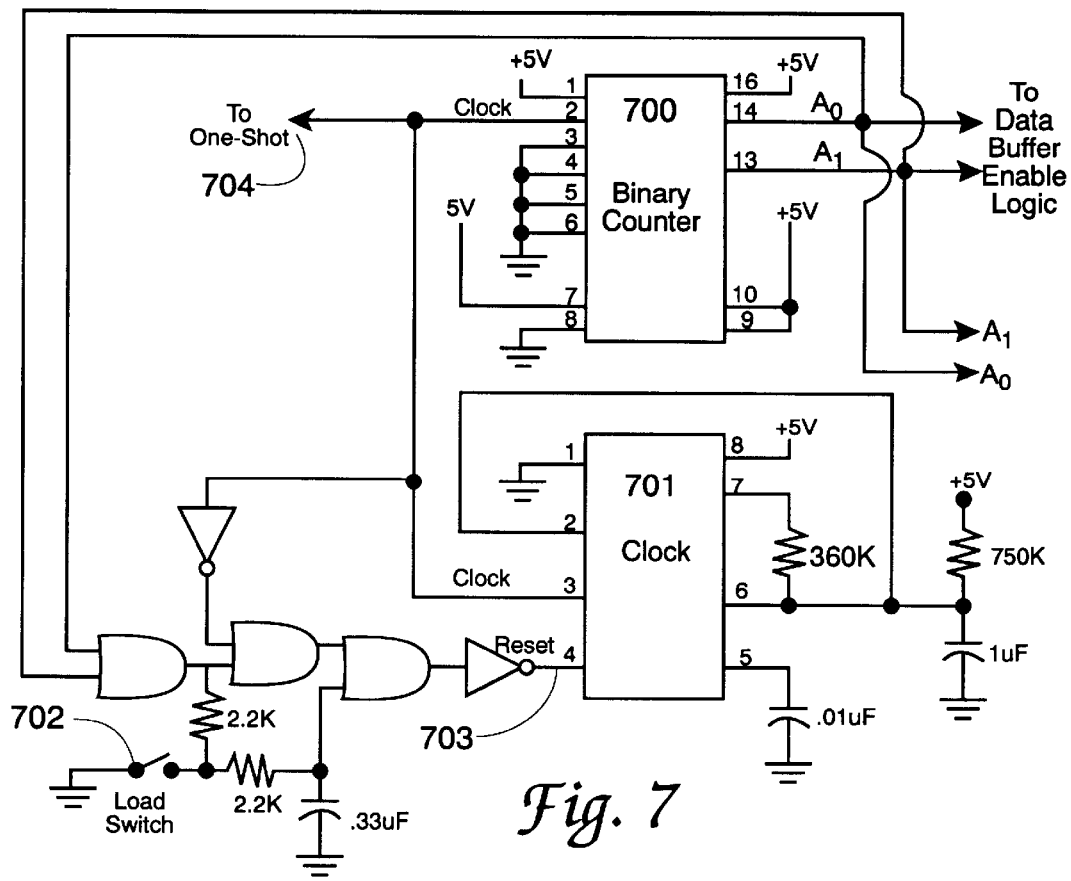
FIG. 7 shows a clock and counter wiring diagram.

Since the STEL-1032 chip has an 8-bit address bus and data bus, the 32-bit registers of the chip must be loaded in four 8-bit blocks, each with a different address. As shown in Table 3, the two Least Significant Bits (LSBs) of the address, $ADDR_1$ and $ADDR_0$, direct the 32-bit data into the proper location in the register. In the 8-bit registers, $ADDR_1$ and $ADDR_0$ are fixed. FIG. 7 shows a clock and counter wiring arrangement for generating the $ADDR_1$ and $ADDR_0$ bits required for 32-bit data entry. With the load switch 702 depressed, the reset input 703 on the clock 701 goes high and the clock 701 begins to run. Resistor and capacitor values are chosen to produce a high-to-low square wave clock with a frequency of about 1 Hz. This allows the address and data to stabilize before being loaded into the PRN coder. The clock output increments the binary counter 700 and triggers one-shot multivibrators via the pathway shown at 704. The clock 701 is controlled by the reset input 703; it continues to run as long as the reset line is held high. Because it is desirable to have the clock 701 run for 4 cycles and toggle through the various $ADDR_1$ and $ADDR_0$ combinations, several logic gates are employed to control clock operation. The following conditions must simultaneously occur to force the reset line 703 and stop the clock 701: a) both $A_1$ and $A_0$ from the binary counter go high, b) the clock transitions to a low state, and c) the load switch 702 is released.

Figure 8:
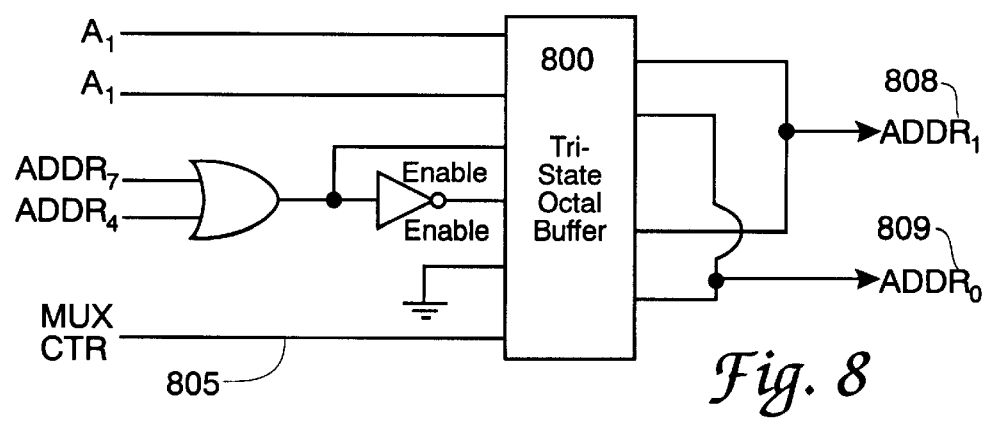
FIG. 8 shows an $ADDR_1$ and $ADDR_0$ generation diagram.

FIG. 8 shows an $ADDR_1$ and $ADDR_0$ wiring arrangement. As shown in FIG. 8, when 32-bit data is being loaded, address bits $ADDR_1$ at 808 and $ADDR_0$ at 809 equal the counter output; when the MUX or CTL registers represented at 805 are being loaded into the Octal Buffer 800, $ADDR_1$ and $ADDR_0$ are fixed.

Figure 9:
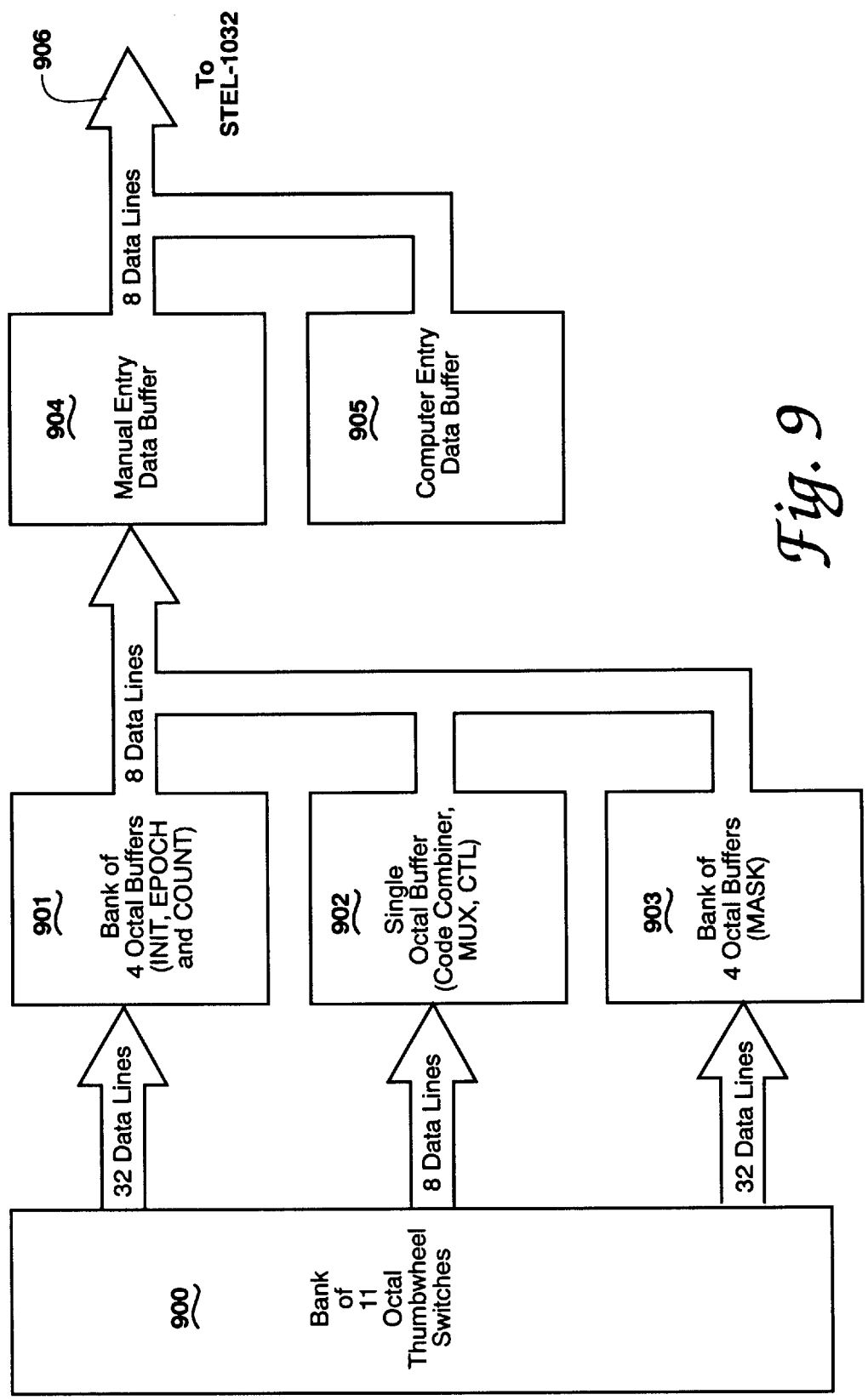
FIG. 9 shows a block diagram of data entry in accordance with the invention.

FIG. 9 shows an overview of the data entry arrangement. Data is entered via a bank of 11 octal thumbwheel switches shown at 900. Since the STEL-1032 has eight data line inputs, the entire 32 bits of data may be entered on the thumbwheel switches 900 through TTL logic gates, but only eight bits are loaded into the registers at a time. The data lines are routed to three different banks of octal buffers, shown at 901, 902 and 903. The first set of four octal buffers at 901 are connected to the 32 Least Significant Bits (LSB) of the thumbwheel switches for entering data into the 32-bit registers: INT, EPOCH, and COUNT. The second set of buffers 902 contains a single octal buffer connected to the LSB on each of the eight right most thumbwheel switches. This allows the 8-bit data to be entered in binary format. The third set of buffers 903 contains four octal buffers connected to the 32 Most Significant Bits (MSB) of the 11 thumbwheel switches. This allows data to be entered into the MASK Register.

The octal buffers are tri-state devices with output characteristics as shown in Table 7. To ensure data is properly loaded into the desired register two things must occur, the correct buffer must be enabled and the proper address must be present.

TABLE 7

Tri-State Octal Buffer Outputs.

| Enable | Input | Output |
|---|---|---|
| L | L | L |
| L | H | H |
| H | X | HI-Z |

Figure 10:
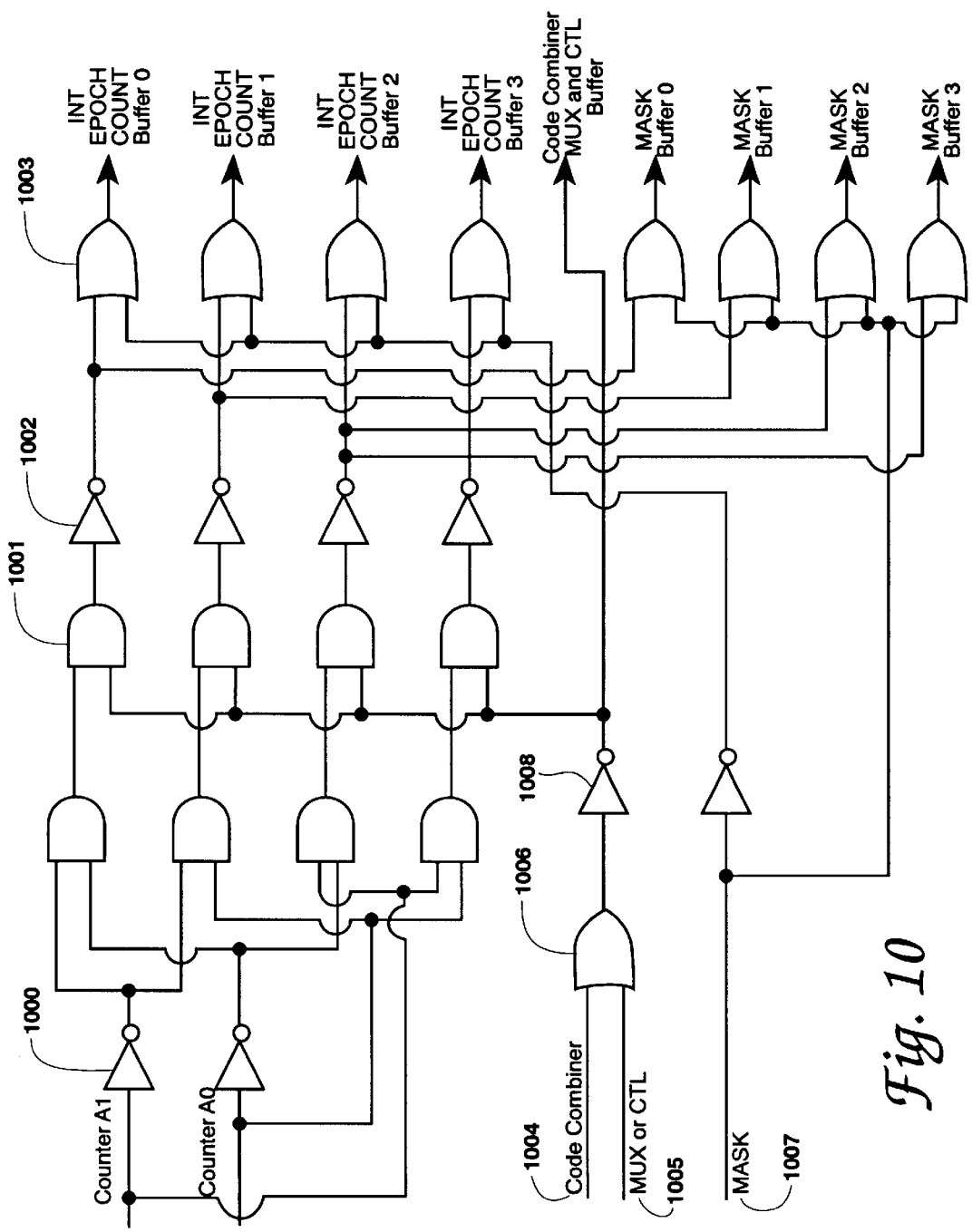
FIG. 10 shows a diagram of data buffer enabling in accordance with the invention.

FIG. 10 illustrates data buffer enabling in accordance with the invention. As shown in FIG. 10, TTL logic and the binary counter outputs used to set $ADDR_1$ and $ADDR_0$ lines ensure the octal buffers are enabled in the proper order. For the data to be correctly entered, only one buffer enable can be low at any time; logic gates, some of which are shown at 1001, 1002 and 1003, prevent two or more buffers from being enabled at one time. The code combiner line 1004 and MUX/CTL line 1005 are normally low but if one is chosen the line transitions high and passes through the OR gate 1006. The high level inverts at 1008 and the low output level enters the AND gates 1001 keeping them low and disabling the 32-bit buffers. When 32-bit data is loaded, through the use of inverters and AND gates the binary counter output enables one buffer for each count. The OR gates 1003 in the 32-bit buffer enables are controlled by the MASK selection line 1007. If the MASK is selected, the line to the MASK buffer OR gates 1003 is low and its buffers are enabled by the counter 1000 otherwise it remains in a high state and the OR gate 1003 output remains in a high state disabling the buffers.

Data enters the STEL-1032 chip via the 11 octal thumbwheel switches 900 with the LSB occupying the rightmost position. Since data is loaded into registers with the LSB first, data is set on the rightmost thumbwheel. The 8-bit data (Code Combiner, MUX and CTL) is entered in binary format on the eight rightmost thumbwheels with the LSB on the right. The 32-bit data is entered in octal format. The binary-to-octal conversion is accomplished by grouping the binary bits into groups of three starting with the LSB and working toward the MSB. A group of three bits are converted to their octal equivalent and entered on the thumbwheel switches starting on the right with the least significant octal number. For example, if the initial fill of a 17 stage register is to be 1 0 1 1 0 0 1 1 0 0 0 1 0 1 1 0 1 with the last bit to be entered into the $B_0$ register, the thumbwheels would be set at 0 0 0 0 2 6 3 0 5 5. Octal thumbwheels were chosen because tables are readily available with the octal representation of primitive polynomials that produce maximal length sequences.

Figure 11:
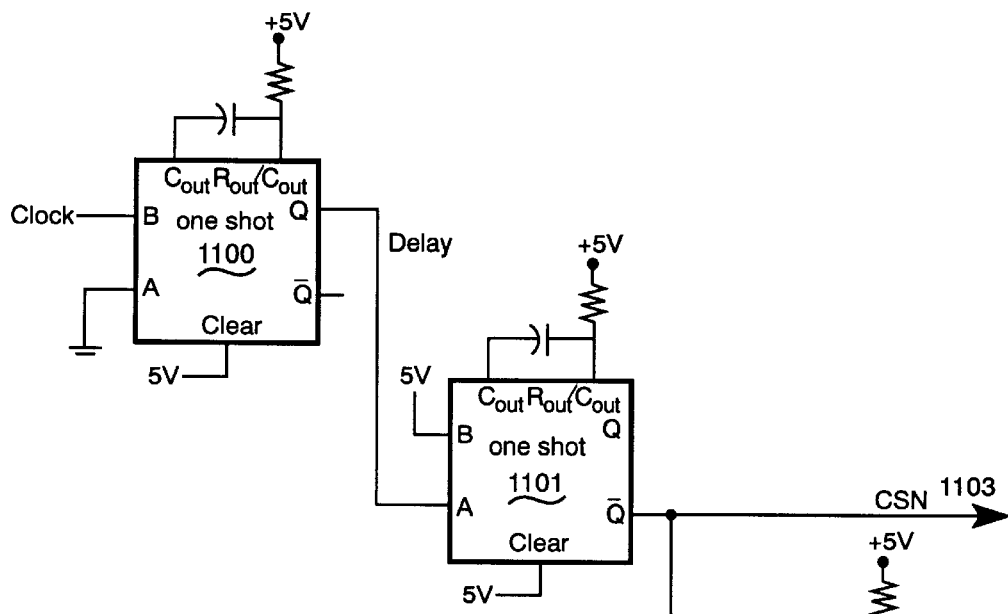
FIG. 11 shows a load pulse circuit diagram.

To load data into the STEL-1032 chip, sequential Chip Select (CSN) and Write Enable (WRN) pulses must occur following data and address stabilization. A low level CSN input enables the loading of data via the data lines and when the WRN line is low data is written into the register(s) selected by the address lines; the data is latched on the rising edge of the WRN pulse. FIG. 11 is a load pulse generator circuit diagram and shows how these pulse are created. Dual non-retriggerable one-shot multivibrators, 1100, 1101 and 1102 are used to generate the pulses CSN at 1103 and WSN at 1104.

Figure 12:
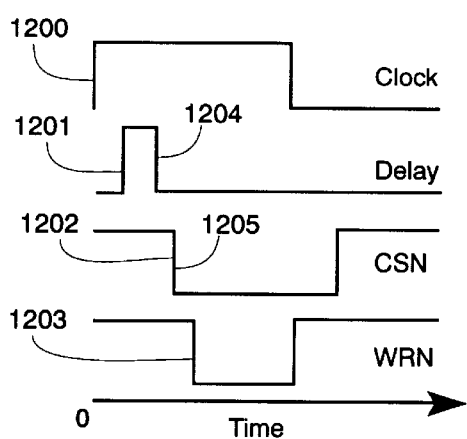
FIG. 12 illustrates data loading pulses.

As shown in FIG. 7, after the LOAD button 702 is depressed the clock 701 is triggered incrementing the counter 700 that enables the buffers and sets $ADDR_1$ and ADDR0. The clock pulse also triggers the first multivibrator which serves as a delay to allow the address and data to stabilize. FIG. 12 provides a comparison of clock, delay, CSN and WRN data loading pulses. On the falling edge 1204 of the delay pulse 1201, the second multivibrator is triggered producing the CSN pulse 1202. The falling edge 1205 of the CSN pulse 1202 triggers a third multivibrator, producing the WRN pulse 1203. The total delay between the CSN 1202 and WRN 1203 pulses is the internal delay from the multivibrator. The pulse widths are controlled by the proper selection of resistors and capacitors for the one shot multivibrators.

After data is loaded into the registers, a LOAD pulse is necessary to fill the PRN Generator with values stored in the INIT register. On the rising edge of the clock pulse following the falling edge of a LOAD pulse, the PRN Generator register and counter register are filled with the contents of the INIT and COUNT registers, respectively. A momentary push button switch is connected to a multivibrator to generate the LOAD pulse.

There are eight other inputs available on the code generator; a reset, three clocks, three external data lines and a data clock. The code generator is reset via a momentary push button switch which sets all register contents inside the PRN coder to zero. The three PRN coders are clocked independently (clock inputs are provided via a BNC connector on the front of the code generator). Data applied to the STIM inputs via BNC connectors are modulo-2 added with the outputs of the corresponding PRN coder. Data is latched on the falling edge of the signal on the BNC connector to the STLD input.

Programming the code generator is accomplished via a front panel. Depressing the LOAD button causes the data entered on the thumbwheel switches to be loaded into the STEL-1032 chip in accordance the coder(s) and register(s) selected.

Figure 13:
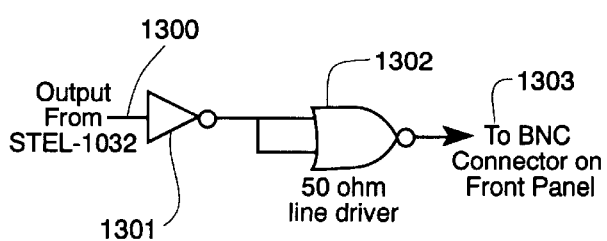
FIG. 13 shows an output arrangement.

FIG. 13 shows a wiring arrangement for a pseudorandom code output from the STEL-1032. A 2-input NOR gate line driver 1302 interfaces between the code generator 1300 and a line 1303 going to a connector on the front panel. The result is a waveform or pulse of proper orientation.

The invention fills a need in the art by providing a pseudorandom code signal generating method and device featuring a pseudorandom electrical signal length varying capability and portability to various laboratory applications without a change in hardware configuration. The portability and elimination of hardware modification for a specific application and signal length provide savings in time and money for spread spectrum communication researchers.

While the apparatus and method herein described constitute a preferred embodiment of the invention, it is to be understood that the invention is not limited to this precise form of apparatus or method and that changes may be made therein without departing from the scope of the invention which is defined in the appended claims.

We claim:

1. A length selectable method of generating a spread spectrum communication scrambling pseudorandom electrical signal by directing data entry into pseudorandom number generator integrated circuit chip controlling registers comprising the steps of:

identifying a pseudorandom electrical signal length-determining feedback logic data sequence by selecting a generating polynomial from Galois field arithmetic tables;

communicating said feedback logic data sequence characters from said identifying step to digital logic converting buffers by manually controllable selector means;

clocking data characters from said communicating step to integrated circuit chip controlling registers; and generating a spread spectrum communication scrambling pseudorandom electrical signal in a pseudorandom number generating register of said integrated circuit chip by clock dependent tapping of data from said pseudorandom number generating register.

2. The length selectable method of claim 1 wherein said communicating step further includes the steps of:

providing a coder selector signal processing wiring arrangement;

manually depressing a ground connected push button switch corresponding to a selected Coder, said push button switch outputting a logic low signal on a corresponding coder line;

receiving a logic low signal corresponding to said selected register at an 8-to-3 line priority encoder; and outputting a 3-bit signal corresponding to an address of said selected Coder.

3. The length selectable method of claim 1, said communicating step further including the steps of:

providing a register selector signal processing wiring arrangement;

manually depressing a ground connected push button switch corresponding to a selected register, said push button switch outputting a logic low signal on a corresponding register line;

receiving a logic low signal corresponding to said selected register at an 8-to-3 line priority encoder; and outputting a 3-bit signal corresponding to an address of said selected register.

4. The length selectable method of claim 1, said communicating step further including the steps of:

providing a register location selection signal processing wiring arrangement;

manually depressing a clock actuating load switch generating a 1 Hertz high-to-low square wave clock signal;

receiving said square wave clock signal by a binary counter;

communicating said square wave clock signal to one-shot multivibrators; and loading said registers according to two least significant bits within each address.

5. The length selectable method of claim 1, said loading step further includes the steps of:

providing a human operator actuating load switch;

providing a bank of 11 octal thumbwheel switches;

loading data into said 11 octal thumbwheel switches with a least significant bit occupying the right most position in each address;

routing 33 data lines from said 11 octal thumbwheel switches to 3 banks of octal buffers, the first and third of said banks including 4 octal buffers and the second of said banks including 1 octal buffer; and communicating chip select and write enable pulses to said pseudorandom number coder.

6. The length selectable method of claim 5 wherein said communicating step further includes the steps of generating chip select and write enable pulses using dual non-retriggerable one-shot multivibrators;

providing a data loading enabling low level chip select pulse and a corresponding low level write enable pulse; and latching said data onto a rising edge of said write enable pulse.

7. The length selectable method of claim 5 wherein said communicating step further includes the steps of providing a buffer enabling and multivibrator triggering clock;

stabilizing said 8-bit address and data;

triggering a chip select pulse producing second multivibrator on a falling edge of a delay pulse; and triggering a write enable pulse producing multivibrator on a falling edge of said chip select pulse.

8. Length-selectable spread spectrum communication hardware pseudorandom code generator apparatus comprising the combination of:

a pseuodorandom code generator integrated circuit chip having a plurality of output selecting control registers received therein;

manually controllable length-determining feedback logic data sequence selector means;

digital logic converting buffers coupled to said selector means;

Galois field arithmetic table selected, length-determining feedback logic data sequence character shifting clock means, said clock means shifting said characters from said digital logic converting buffers to pseudorandom code generator integrated circuit chip controlling registers;

a spread spectrum communication scrambling pseudorandom electrical signal generating register within said pseudorandom code generator integrated circuit chip, said register operable by clock dependent tapping of data therefrom; and means for coupling said pseudorandom electrical signal from said integrated circuit chip to a spread spectrum communication apparatus.

9. The length selectable apparatus of claim 8 wherein manually controllable length-determining feedback logic data sequence selector means further includes:

a register selector signal processing wiring arrangement;

a ground connected manually depressable push button switch corresponding to a selected register, said push button switch outputting a logic low signal on a corresponding register line;

a logic low signal corresponding to said selected register received at an 8-to-3 line priority encoder; and a 3-bit output signal corresponding to an address of said selected register.

10. The length selectable apparatus of claim 8 wherein manually controllable length-determining feedback logic data sequence selector means further includes:

a register location selection signal processing wiring arrangement;

a manually depressable clock actuating load switch generating a 1 Hertz high-to-low square wave clock signal;

a square wave clock signal received by a binary counter and communicated to one-shot multivibrators; and register loading means dependent on two least significant bits within each address.

* * * * *